(12) United States Patent
Xu et al.

(10) Patent No.: US 11,606,722 B2
(45) Date of Patent: Mar. 14, 2023

(54) NETWORK SLICE DEPLOYMENT METHOD AND APPARATUS

(71) Applicant: HUAWEI TECHNOLOGIES CO., LTD., Guangdong (CN)

(72) Inventors: Ruiyue Xu, Shanghai (CN); Kai Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 179 days.

(21) Appl. No.: 16/787,627

(22) Filed: Feb. 11, 2020

(65) Prior Publication Data

US 2020/0178122 A1 Jun. 4, 2020

Related U.S. Application Data

(63) Continuation of application No. PCT/CN2018/091662, filed on Jun. 15, 2018.

(30) Foreign Application Priority Data

Aug. 11, 2017 (CN) .......................... 201710687873.8

(51) Int. Cl.
*H04W 4/00* (2018.01)
*H04W 28/18* (2009.01)
(Continued)

(52) U.S. Cl.
CPC ......... *H04W 28/18* (2013.01); *H04L 41/0806* (2013.01); *H04L 41/5003* (2013.01);
(Continued)

(58) Field of Classification Search
CPC .... H04L 41/5003; H04W 28/18; H04W 28/24
See application file for complete search history.

(56) References Cited

U.S. PATENT DOCUMENTS

2015/0237663 A1* 8/2015 Wilhelmsson ........ H04W 76/14
455/450
2016/0269298 A1 9/2016 Li et al.
(Continued)

FOREIGN PATENT DOCUMENTS

CN 106982458 A 7/2017
EP 1729465 A2 12/2006
(Continued)

OTHER PUBLICATIONS

Extended European Search Report issued in European Application No. 18845005.0 dated Jun. 30, 2020,10 pages.
(Continued)

*Primary Examiner* — Omoniyi Obayanju
(74) *Attorney, Agent, or Firm* — Fish & Richardson P.C.

(57) ABSTRACT

This application provides a network slice deployment method. The method may include obtaining, by a first network manager, node instance information, determining, by the first network manager, transmission requirement information corresponding to the node instance information, and sending a transmission request message to a transport network manager. The node instance information may include identifier information of a node instance or a network address of a node instance, and the transmission request message may include the transmission requirement information and the node instance information.

20 Claims, 4 Drawing Sheets

(51) Int. Cl.
    *H04L 41/0806* (2022.01)
    *H04L 41/5003* (2022.01)
    *H04W 28/24* (2009.01)
    *H04W 72/08* (2009.01)
    *G16Y 10/75* (2020.01)
    *H04W 84/04* (2009.01)

(52) U.S. Cl.
    CPC ......... *H04W 28/24* (2013.01); *H04W 72/087* (2013.01); *G16Y 10/75* (2020.01); *H04W 84/042* (2013.01)

(56) References Cited

U.S. PATENT DOCUMENTS

| | | | |
|---|---|---|---|
| 2017/0070892 A1 | 3/2017 | Song et al. | |
| 2017/0141973 A1 | 5/2017 | Vrzic | |
| 2017/0164187 A1 | 6/2017 | Lu | |
| 2018/0192445 A1* | 7/2018 | Jiang | H04W 72/0466 |
| 2019/0037504 A1* | 1/2019 | Shimura | H04W 52/267 |
| 2019/0386878 A1* | 12/2019 | Chou | H04L 41/0893 |

FOREIGN PATENT DOCUMENTS

| | | |
|---|---|---|
| WO | 2015012863 A1 | 1/2015 |
| WO | 2016192639 A1 | 12/2016 |
| WO | 2017016598 A1 | 2/2017 |

OTHER PUBLICATIONS

Huawei, "Key principles for Support of Network Slicing in RAN", RAN WG3 Meeting # 93 R3-161751, Aug. 26, 2016, 6 pages.

Telecom Italia et al., "23.501: S-NSSAI to NSI relationship and introduction of the Core Network Slice", SA WG2 Meeting # 121 S2-173206, May 19, 2017, 5 pages.

NTT Docomo, "Update of Network Slicing definitions for TS23. 501", SA WG2 Meeting # 118bis S2-170216, Jan. 20, 2017, 3 pages.

Ericsson et al., "Use Case and Requirement Supervise network slice instance", 3GPP TSG SA WG5 (Telecom Management) Meeting #110 S5-166365, Nov. 18, 2016, 3 pages.

PCT International Search Report and Written Opinion in International Application No. PCT/CN2018/091,662, dated Aug. 29, 2018, 16 pages (With English Translation).

Office Action issued in Chinese Application No. 201710687873.8 dated Mar. 2, 2021, 7 pages.

* cited by examiner

NETWORK SLICE DEPLOYMENT METHOD AND APPARATUS

CROSS-REFERENCE TO RELATED APPLICATIONS

This application is a continuation of International Application No. PCT/CN2018/091662, filed on Jun. 15, 2018, which claims priority to Chinese Patent Application No. 201710687873.8, filed on Aug. 11, 2017. The disclosures of the aforementioned applications are hereby incorporated by reference in their entireties.

TECHNICAL FIELD

Embodiments of this application relate to the communications field, and in particular, to a network slice deployment method and an apparatus.

BACKGROUND

Facing the future, mobile communications technologies and industries are about to enter a development phase of 5th-generation mobile communications (5G). 5G meets people's requirements for ultra-high traffic density, ultra-high connection density, ultra-high mobility, and the like, and provides users with extreme service experience such as high-definition videos, virtual reality, augmented reality, and cloud desktops. 5G penetrates into fields such as the internet of things and is deeply integrated with industrial facilities, medical instruments, and means of communications, to effectively meet informatization service requirements of vertical industries, such as industrial, medical, and transportation industries.

A conventional network cellular network uses a "one-size-fits-all" network architecture, which has a dedicated support and information technology (IT) system and is suitable for a single-service type network. However, by using this vertical architecture, an operator has difficulty in extending a telecommunication network, and also has great difficulty in performing adjustment based on continuously changing user requirements, and meeting a requirement of a new-type use case. Therefore, in a 5G era, a conventional cellular network and a "one-size-fits-all" method need to be adjusted to support thousands of use cases, a plurality of user types, and use of various applications.

In a future 5G system, network resources are sliced, a single physical network may be divided into a plurality of logical virtual networks, and an independent network slice is allocated to a typical service scenario. In the slice, for a service requirement, an enhanced network architecture is involved, to optimize and implement resource configuration, so that a plurality of network slices may share a network infrastructure, thereby improving network resource utilization.

SUMMARY

Embodiments of this application provide a method and an apparatus for creating a transport network, to resolve a problem in the prior art of low efficiency in establishing a transport network only by manually determining and inputting a related parameter, and a requirement for fast establishment of a network slice cannot be met.

According to a first aspect, an embodiment of this application provides a network slice deployment method. The method includes:

obtaining, by a first network management unit, node instance information; determining, by the first network management unit, transport requirement information corresponding to the node instance information; and sending, by the first network management unit, a transport request message to a transport network manager, where the node instance information includes identifier information of a node instance or a network address of a node instance, and the transport request message carries the transport requirement information and the node instance information. The first management unit may be a network management unit NM, and the NM includes one or both of an end-to-end network management function and an end-to-end network orchestration function. The NM may be a cross-domain management unit, a cross-domain network slice management unit, a network slice management function unit, or the like. The node instance information is used to describe a node instance or describe an access manner of a node instance.

An embodiment of this application provides a new network slice deployment method. A transport network can be automatically created, to improve network slice deployment efficiency.

With reference to the first aspect, in a possible implementation of the first aspect, the first network management unit sends node requirement information to a second network management unit, where the node requirement information includes an identifier of the node requirement information. The node requirement information is used to describe a requirement for deploying a node, for example, a specification, and a quantity of virtual machines that are needed. The node requirement information may include one or more of the following information: deployment template information of a node, a deployment specification of the node, a constraint requirement on a deployment location of the node, affinity and anti-affinity of the node, a latency requirement of the node, and the like.

With reference to the first aspect or the first possible implementation of the first aspect, in a second possible implementation of the first aspect, the first network management unit obtains node instance description information corresponding to the node instance information. The node instance description information includes one or more of the following: the identifier of the node requirement information, a node type, an identifier of a node template, location information of a node, and specification information of the node.

With reference to the first aspect or the first or the second possible implementation of the first aspect, in a third possible implementation of the first aspect, the first network management unit determines the transport requirement information based on the node instance description information corresponding to the node instance information. The transport requirement information may include one or more of the following: a transport deployment specification, a latency, bandwidth, location constraint information, affinity and anti-affinity rules, quality of service QoS, bearer information, a network type, a reliability requirement, a mobility requirement, isolation requirement information, and the like.

Optionally, the first network management unit may further determine a transport template based on the node instance information, to determine the transport requirement information, where the transport template includes the transport requirement information.

Optionally, the first network management unit may further determine the transport requirement information based on the node instance information and a preset policy. The preset policy may be a correspondence between the node description information and the transport requirement information.

According to a second aspect, an embodiment of this application provides a network slice deployment method. The method includes:

obtaining, by a transport network manager, node instance information, where the node instance information includes an identifier of a node instance or a network address of a node instance; determining, by the transport network manager, transport requirement information corresponding to the node instance information; and configuring, by the transport network manager, a transport resource corresponding to the transport requirement information.

In this embodiment of this application, the transport network manager determines the transport requirement information, to configure the transport resource, thereby implementing network element function centralization, improving network creation efficiency, and satisfying rapid service launching.

With reference to the second aspect, in a first possible implementation of the second aspect, the transport network manager obtains node instance description information corresponding to the node instance information. The node instance description information includes one or more of the following: an identifier of node requirement information, an identifier of a node template, a node type, location information of a node instance, and specification information of the node instance.

The transport network manager may determine the transport requirement information corresponding to the node instance information in the following several manners:

1. The transport network manager determines the transport requirement information based on the node instance description information corresponding to the node instance information.

2. The transport network manager determines a transport template based on the node instance information, to determine the transport requirement information, where the transport template includes the transport requirement information.

With reference to the second aspect or the first possible implementation of the second aspect, in a second possible implementation of the second aspect, before the determining, by the transport network manager, a transport requirement, the transport network manager first receives a transport management request, where the transport management request carries the transport template or transport template indication information, and the transport template indication information is used to obtain the transport template.

With reference to the second aspect, or the first or the second possible implementation of the second aspect, in a third possible implementation of the second aspect, before the obtaining, by a transport network manager, node instance information, the transport network manager sends a query request to a second network management unit, where the query request carries the node requirement information or slice information. The second network management unit may be a domain management unit DM.

According to another aspect, an embodiment of this application provides a network management unit. As a network slice management apparatus, the network management unit may implement functions performed by the first network management unit in the foregoing method examples. The functions may be implemented by hardware, may be implemented by executing corresponding software by hardware, or may be implemented by using a chip. The hardware or the software includes one or more modules corresponding to the foregoing functions.

In a possible implementation, a structure of the network management unit includes a processor and a communications interface. The processor is configured to support the first network management unit in performing the corresponding functions in the foregoing method. The communications interface is configured to support communication between the first management unit and another network element. The network management unit may further include a memory. The memory is configured to couple to the processor. The memory stores a program instruction and data that are necessary for the network management unit.

According to another aspect, an embodiment of this application provides a transport network manager. As another network slice management apparatus, the transport network manager may implement functions performed by the transport network manager in the foregoing method embodiments. The functions may be implemented by hardware, may be implemented by executing corresponding software by hardware, or may be implemented by using a chip. The hardware or the software includes one or more modules corresponding to the foregoing functions.

In a possible implementation, a structure of the transport network manager includes a processor and a communications interface. The processor is configured to support the transport network manager in performing the corresponding functions in the foregoing method. The communications interface is configured to support communication between the transport network manager and another network element. The transport network manager may further include a memory. The memory is configured to couple to the processor. The memory stores a program instruction and data that are necessary for the transport network manager.

According to another aspect, an embodiment of this application provides a communications system. The system includes the network management unit and the transport network manager in the foregoing aspects.

According to still another aspect, an embodiment of this application provides a computer storage medium. The computer storage medium is configured to store a computer software instruction used by the foregoing network management unit, and includes a program designed for performing the foregoing aspects.

According to still another aspect, an embodiment of this application provides a computer storage medium. The computer storage medium is configured to store a computer software instruction used by the foregoing transport network manager, and includes a program designed for performing the foregoing aspects.

Compared with the prior art, the embodiments of this application provide a new network slice deployment method. A transport network can be automatically created, to improve network slice deployment efficiency.

DESCRIPTION OF EMBODIMENTS

Before technical solutions are described, to facilitate understanding of the technical solutions in the embodiments of this application, some terms in the embodiments of this application are first explained and described.

A network slice may also be referred to as a network slice instance, and is a combination of network function (NF) and resources that ensures that a carried service can meet a requirement of a service level agreement (SLA). Hard isolation (for example, physical isolation) or soft isolation (for example, logical isolation) may be performed on these NFs and resources based on different requirements, and each network slice is logically independent. The network slice may include at least a core network (CN) part, an access network (AN) part, and a transport network (TN) part, or may include any two or one of a CN part, an AN part, and a TN part. A network slice is a set including a group of network functions, resources for running these network functions, and particular configurations of these network functions. These network functions and corresponding configurations form a complete logical network. The logical network includes a network feature required for meeting a particular service, and a corresponding network service is provided for this particular service scenario.

The network slice is a broad concept, and may be a conventional network or a dedicated network. A network slice subnet is also a network slice.

A network slice subnet may be referred to as a network slice subnet instance, and is a combination of network functions and resources. Usually, the network slice subnet may be obtained by splitting a network slice, or a network slice may be directly used as the network slice subnet.

A concept such as the network slice or the network slice subnet mentioned in this specification may be considered to be equivalent to a network slice instance or a network slice subnet instance.

A tenant refers to one or more network service users sharing a group of physical and virtual resources. The tenant may be a renter of an operator network. For example, an electric power company rents the operator network to deploy a smart metering service, and the electric power company is a tenant of an operator.

Figure 1:
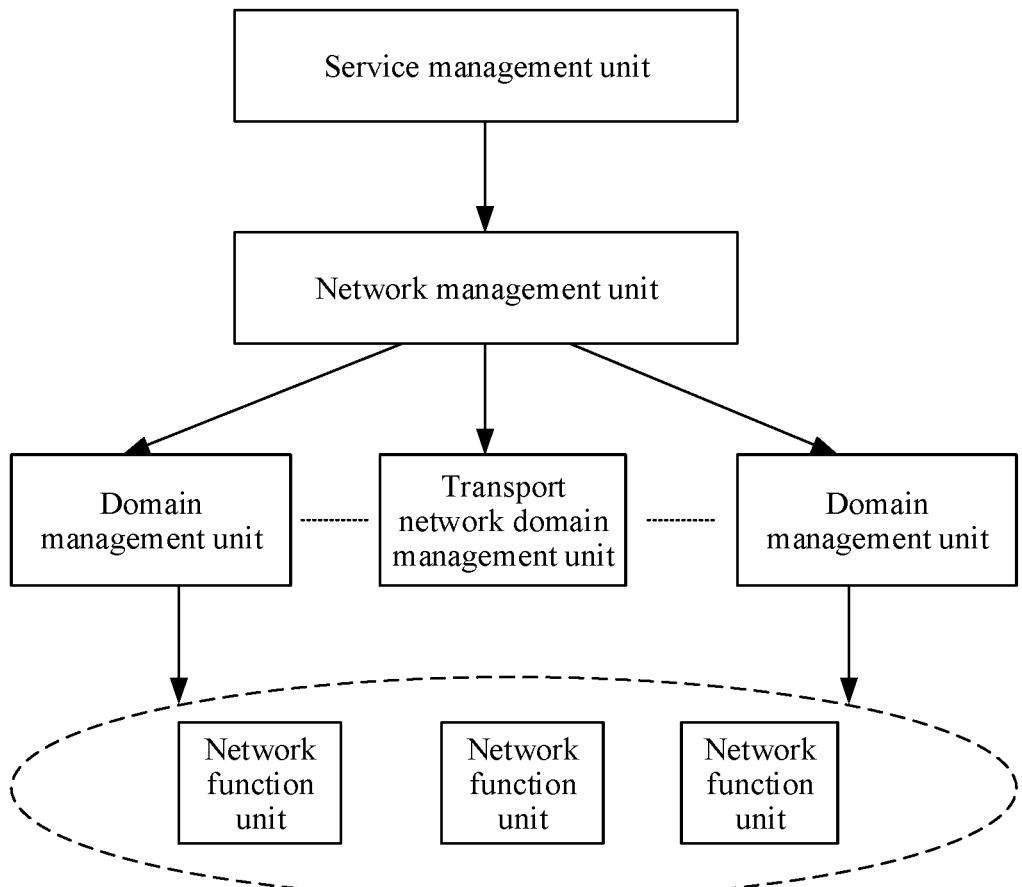
FIG. 1 is a simplified schematic diagram of a network architecture according to an embodiment of this application.

FIG. 1 is a network architecture to which an embodiment of this application is applied. A transport network management method provided in this embodiment of this application may be implemented by function units in the network architecture shown in FIG. 1, and the network architecture may be deployed in a 5G system. The following describes each function unit in the network architecture shown in FIG. 1 in detail.

As shown in FIG. 1, the network architecture may include a service management (SM), a network management (NM), a domain management (DM), a transport network manager (TNM), and the like.

The SM is a service management unit, and is mainly configured to: receive a service requirement of a related tenant, convert the service requirement into a requirement related to a network slice, and perform service management. The SM may be deployed in an operation support system (OSS), or may be deployed outside an OSS. The SM may be a management unit or an operation unit of the tenant. The SM may be independently deployed, or may be integrated into a management unit (for example, a business support system (BSS), a service management unit, a service orchestration unit, or a service management and orchestration unit). It should be noted that the SM is not limited to the name shown in FIG. 1, and the SM may alternatively be named as a customer service management function or a communication service management function (CSMF).

The NM includes one or both of an end-to-end network management function and an end-to-end network orchestration function, and may have some or all of the following functions: end-to-end network management (for example, network lifecycle management, network template management, network fault management, network performance management, and network configuration management), mapping between an end-to-end network function, a subnet function, and a network function, coordination of network resources or sub-SLAs provided in different domains (for example, an access network domain, a core network domain, and a transport domain), decomposition of network requirement information into subnet requirement information, and uniform orchestration of subnet functions and network functions provided in subdomains, so that subnets or network functions provided in different subdomains can meet a target service or network requirement (for example, a requirement of an SLA, a requirement of a key performance indicator (KPI), and a requirement of quality of service (QoS)). The NM may be deployed in an OSS, or may be deployed outside an OSS. The NM may be independently deployed, or may be integrated into a management unit (for example, a network orchestration unit, a network management and orchestration unit, a service management unit, a service orchestration unit, a service management and orchestration unit, or a network function virtualization orchestrator (NFVO)). It should be noted that the NM is not limited to the name shown in FIG. 1, and the NM may alternatively be named as a cross-domain management unit, a cross-domain network slice management unit, a network slice management function (NSMF), or the like.

The DM includes one or both of a subnet management function and an orchestration function, and may have some or all of the following functions: domain management, which, for example, may include subnet lifecycle management (creation, update, and deletion), subnet fault management, subnet performance management, and subnet configuration management; service management (including service lifecycle management, service fault management, service performance management, service configuration management, and the like); and network resources, for example, coordination of NFs and network element (NE), for uniform orchestration. The DM may be deployed in an OSS, or may be deployed outside an OSS. The DM may be independently deployed, or may be integrated into a management unit (for example, a network management unit, a network orchestration unit, a network management and orchestration unit, a network element management unit, a network function management unit, a service management unit, a service orchestration unit, a domain management unit, a service management and orchestration unit, or an NFVO). It should be noted that the DM is not limited to the name shown in FIG. 1, and the DM may alternatively be named as a domain slice management unit, a network slice subnet management function (NSSMF), or the like.

Specifically, a subnet managed by the DM may include one or more of the following parts: an AN part, a CN part, and a TN part. When the subnet managed by the DM includes only the AN part, it may be considered that the subnet management unit is an AN DM. When the subnet managed by the DM includes only the CN part, it may be considered that the subnet management unit is a CN DM. When the subnet managed by the DM includes the AN part and the CN part, it may be considered that the subnet management unit is a Mix DM.

The TNM includes one or both of a transport network management function and a transport network orchestration function, and may have some or all of the following functions: management of a transport network part, which, for example, may include lifecycle management (creation, update, and deletion) of the transport network part, fault management of the transport network part, performance management of the transport network part, configuration management of the transport network part, and the like. The TNM may be deployed in an OSS, or may be deployed outside an OSS. The TNM may be independently deployed, or may be integrated into a management unit (for example, a network management unit, a network orchestration unit, a network management and orchestration unit, a domain management unit, a network element management unit, a service management unit, a service orchestration unit, a domain management unit, a service management and orchestration unit, or an NFVO). It should be noted that the TNM is not limited to the name shown in FIG. 1, and the TNM may alternatively be named as a (transport network) subnet management unit, a network slice transport network management unit, or the like. The transport network may refer to a link.

FIG. 1 is merely an example of an architecture diagram. In addition to the function nodes shown in FIG. 1, the network architecture may further include another function node. This is not limited in this embodiment of this application.

Figure 2:
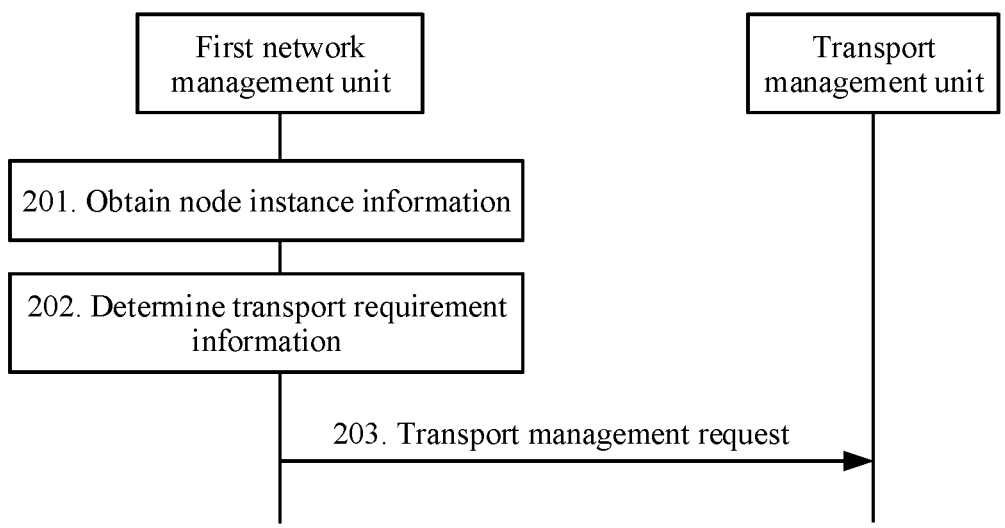
FIG. 2 is a flowchart of a network slice deployment method according to an embodiment of this application.

FIG. 2 shows a network slice deployment method according to an embodiment of this application. The method may be applied to the network architecture shown in FIG. 1, and a specific method is as follows:

S201. A first network management unit obtains node instance information, where the node instance information includes identifier information of a node instance or a network address of a node instance. The node instance is a specific network function instance or network element device. In this application, concepts of the node instance and a node are the same. In this application, the word "node instance" is used for description. The network address of the node instance may include an IP address of the node instance, a Mac address of the node instance, or the like.

Optionally, the first network management unit may obtain a plurality of pieces of node instance information.

The first network management unit may be the NM shown in FIG. 1. In this embodiment of this application, an NSMF is used as an example for specific description.

Figure 3:
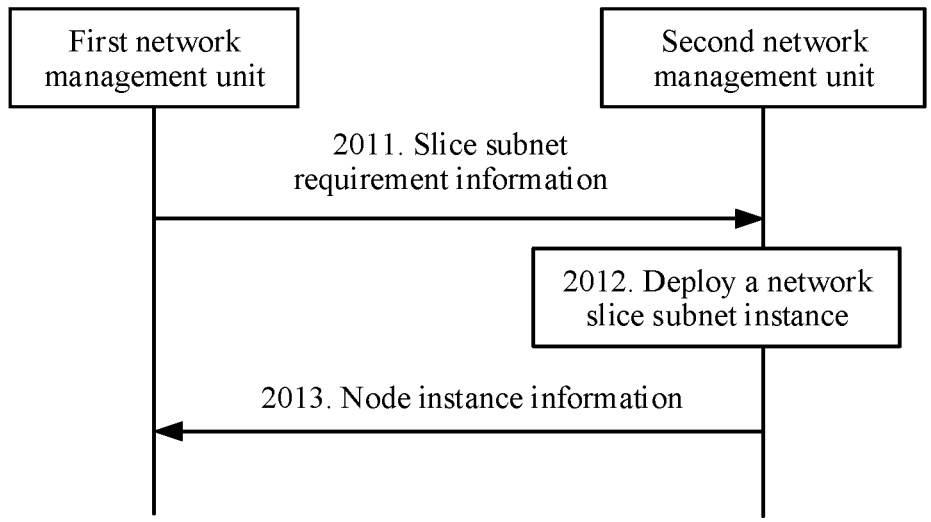
FIG. 3 is a flowchart of another network slice deployment method according to an embodiment of this application.

A manner in which the NSMF obtains the node instance information is shown in FIG. 3, and may specifically include the following implementation steps.

S2011. The NSMF sends a network slice subnet management request to a second network management unit, where the network slice subnet management request carries network slice subnet requirement information. The second network management unit may be a DM. In this embodiment of this application, specifically, an NSSMF is used as an example for description.

Specifically, the network slice subnet requirement information may include one or more of the following information:

a type of a network slice or a network slice subnet, a quantity of users that need to be carried by the network slice subnet, distribution of the users that need to be carried by the network slice subnet, a coverage level of the network slice subnet, a latency of the network slice subnet, bandwidth of the network slice subnet, requirement information of a deployment location of the network slice subnet, a network slice subnet template corresponding to the network slice subnet, identifier information of the network slice subnet template corresponding to the network slice subnet, and deployment specification information of the network slice subnet template corresponding to the network slice subnet.

It may be understood that the network slice subnet management request is a named request message name, and is used to request the DM to manage the network slice subnet. A message name is not limited herein. The network slice subnet management request may further include any one of the following: a network slice subnet creation request, a network slice subnet instantiation request, a network slice subnet modification request, a network slice subnet capacity expansion request, a network slice subnet configuration request, and the like.

For example, when an internet of vehicles enterprise rents a network of an operator to implement a self-driving service, the internet of vehicles enterprise signs a related agreement with the operator; and a network management system of the operator sends a network slice subnet creation request to an NSSMF, and the network slice subnet creation request is used to request the NSSMF to create or allocate a corresponding network slice subnet instance to form a network slice instance to support the self-driving service of the internet of vehicles enterprise.

S2012. The NSSMF deploys a corresponding network slice subnet instance based on the network slice subnet requirement information.

The deploying a corresponding network slice subnet instance based on the network slice subnet requirement information may specifically include: creating a corresponding network slice subnet instance based on the network slice subnet requirement information, or instantiating a corresponding network slice subnet instance based on the network slice subnet requirement information.

One network slice subnet instance may include one or more node instances. Therefore, deploying one network slice subnet instance includes deploying one or more node instances.

Deploying a node instance may include creating the node instance, configuring the node instance, or instantiating the node instance.

Specifically, deploying the node instance includes allocating or selecting a resource required by the node instance, and configuring the node instance. The resource may include a computing resource, a storage resource, a network resource, and the like.

The node instance is a network function or a network element device, and includes but is not limited to one or more of the following:

an authentication server function (AUSF);

an access and mobility management function (AMF);

a data network (DN), for example, operator services and Internet access or 3rd party services;

a structured data storage network function (SDSF);
an unstructured data storage network function (UDSF);
a network exposure function (NEF);
a network repository function (NRF), which may also be represented as a network function repository function;
a policy control function (PCF);
a session management function (SMF);
unified data management (UDM);
a user plane function (UPF);
an application function (AF);
a next generation NodeB (gNB) or a 5G base station;
an evolved NodeB function (eNB);
an evolved LTE evolved NodeB (eLTE eNB);
a NodeB (node B, NB);
a next generation NodeB central unit (gNB Central Unit);
a next generation NodeB distributed unit (gNB Distribute Unit); and
a mobility management entity (MME).

The node instance may also refer to a connection point of any one of the foregoing network functions, and one of the network functions may include one or more connection points.

In step S2012, the NSSMF deploys the corresponding network slice subnet instance based on the network slice subnet requirement information. The following uses several feasible implementations as examples.

Manner 1: The NSSMF decomposes the network slice subnet requirement information into node requirement information, and deploys a corresponding node instance based on the node requirement information to obtain node instance information. Optionally, after decomposing the network slice subnet requirement information into the node requirement information, the NSSMF sends the node requirement information to a node instance management unit, and the node instance management unit deploys the corresponding node instance.

The node requirement information is used to describe a requirement for deploying a node, for example, a specification, and a quantity of virtual machines that are needed. The node requirement information may include one or more of the following information:
deployment template information of a node, a deployment specification of the node, a constraint requirement on a deployment location of the node, affinity and anti-affinity of the node, a latency requirement of the node, and the like.

The following uses the latency requirement of the node as an example to describe in detail how the NSSMF decomposes the network slice subnet requirement information into the node requirement information. For example, a latency of a network slice subnet is 10 ms, and the network slice subnet includes a node 1 and a node 2. A local preset policy or algorithm indicates that a latency ratio of the node 1 to the node 2 is 2:3. In this case, a latency requirement of a node is decomposed into that a latency of the node 1 is 4 ms, and a latency of the node 2 is 6 ms.

For another example, when the network slice subnet requirement information is a quantity of users, the NSSMF determines, based on the quantity of users, whether a node deployment specification is large or small.

The node instance information is used to identify the node instance or describe an access manner of the node instance. Specifically, the deploying a corresponding node instance based on the node requirement information, to generate node instance information includes:

allocating, by the NSSMF, a node instance identifier for uniquely identifying the node instance, or allocating and configuring, by the NSSMF, the network address of the node instance.

Manner 2: The NSSMF decomposes the network slice subnet requirement information into the node requirement information. A specific decomposition process is the same as that in the foregoing manner.

A node template is obtained based on the node requirement information, and the corresponding node instance is deployed based on the node template, to generate the node instance information. The node instance information is used to describe the node instance. The node template is used to describe deployment information of the node instance. The node template includes one or more of the following information: a type of the node, a version of the node, provider information of the node, virtual resource information needed by the node, and the like. It should be noted that a template may also be referred to as a descriptor, a blueprint, or the like, and same concepts are described in this application. The node template may include any one of the following: a network function template, a virtual network function template, a network element template, and a connection point template.

For a specific manner of deploying the corresponding node instance, to generate the node instance information, refer to the foregoing implementation.

Manner 3: The NSSMF obtains a corresponding network slice subnet template based on the network slice subnet requirement information. Specifically, the network slice subnet requirement information carries identifier information of the network slice subnet template, and the identifier information of the network slice subnet template is used to obtain the network slice subnet template.

The network slice subnet template includes node requirement information required for forming the network slice subnet, and the node instance is deployed based on the node requirement information, to generate the node instance information. The node instance information is used to describe the node instance.

For a specific manner of deploying the corresponding node instance, to generate the node instance information, refer to the foregoing implementation.

Manner 4: The NSSMF obtains a corresponding network slice subnet template based on the network slice subnet requirement information. The network slice subnet template includes node template information required for forming the network slice subnet. The node template is obtained based on the node template information, and the node instance is deployed based on the node template, to generate the node instance information. The node instance information is used to describe the node instance.

The node template information includes one or more of the following: an identifier of a node template, a deployment level of the node template, and a name of the node template.

For a specific manner of deploying the corresponding node instance, to generate the node instance information, refer to the foregoing implementation.

Optionally, the NSSMF further determines node instance description information corresponding to the node instance information, and sends the node instance description information to the NSMF based on a requirement.

The node instance description information is specifically used to describe the node instance. The node instance description information may include one or more of the following: an identifier of node requirement information, an identifier of a node template, a node type, location information of a node, and specification information of the node.

Specifically, when the node instance description information is the identifier of the node requirement information, the NSSMF deploys the node instance based on the node requirement information. The identifier of the node requirement information is used to uniquely identify the node requirement information. Therefore, the identifier of the node requirement information corresponding to the node instance information may be directly determined.

When the node instance description information is the identifier of the node template, the NSSMF deploys the node instance based on the node template. The identifier of the node template is used to uniquely identify the node template. Therefore, the identifier of the node template corresponding to the node instance information may be directly determined.

When the node instance description information is the identifier of the node template, the node requirement information or the node template includes the node type. Therefore, the node type corresponding to the node instance information may be directly determined.

When the node instance description information is the location information of the node, the NSSMF deploys the node instance at a corresponding location (for example, an area or a DC). Therefore, the node location information corresponding to the node instance information may be directly determined.

When the node instance description information is the location information of the node, when a deployed node instance is of a specification, the NSSMF may directly determine a specification of the node corresponding to the node instance information.

The node type information is used to distinguish different types of nodes, and a node type may be any one of the following:

an authentication server function (AUSF); an access and mobility management function (AMF); a data network (DN), for example, operator services and Internet access or 3rd party services; a structured data storage network function (SDSF); an unstructured data storage network function (UDSF); a network exposure function (NEF); a network repository function (NRF), which may also be represented as a network function repository function; a policy control function (PCF); a session management function (SMF); unified data management (UDM); a user plane function (UPF); an application function (AF); a next generation NodeB function (gNBF) or a 5G base station function; an evolved NodeB function (eNBF); an evolved LTE evolved NodeB function (eLTE eNB); and a NodeB function (NBF).

The identifier of the node template is used to identify the node template, and the node template includes one or more of the following information: a type of the node, a version of the node, provider information of the node, virtual resource information needed by the node, and the like.

The identifier of the node requirement information is used to represent requirement information of a node. The node requirement information includes one or more of the following information: a template of the node, a deployment specification of the node, affinity and anti-affinity requirements of the node, and the like.

The location information of the node is used to represent a deployment location of a node.

The deployment specification information of the node is used to describe capacity information or a deployment level (e.g. Flavor Id or Instantiation level) of a node.

S2013. The NSSMF sends node instance information to the NSMF.

Optionally, the NSSMF sends a plurality of pieces of node instance information to the NSMF.

After completing deployment of the corresponding network slice subnet, the NSSMF returns a network slice subnet management request completion message to the NSMF. The request completion message carries the node instance information.

Optionally, after completing deployment of the corresponding network slice subnet, the NSSMF sends a notification message to the NSMF. The notification message carries the node instance information.

Before S2011, to be specific, before the NSMF sends the network slice subnet management request to the second network management unit, the NSMF may further receive a network slice management request. Similarly, a network slice creation request is a named request message name, and is used to request the NM to manage the network slice. A message name is not limited herein. The network slice creation request may be a network slice management request, a network slice instantiation request, a network slice modification request, a network slice capacity expansion request, a network slice configuration request, or the like.

The network slice creation request carries network slice requirement information. The network slice requirement information is used to determine information required for creating the network slice, and may specifically include, but is not limited to, one or more of the following information: bandwidth, a latency, coverage, a success rate, a location, a traffic model, a quantity of users, and user distribution.

S202. The first network management unit determines transport requirement information corresponding to the node instance information.

Specifically, the first network management unit may determine node instance description information based on the node instance information, and determine, based on the node instance description information, the transport requirement information corresponding to the node instance information.

Optionally, the first network management unit may further determine the node instance description information based on the node instance information, and determine a corresponding transport descriptor based on the node instance description information, where the transport descriptor includes the transport requirement information and the corresponding node instance description information, so that the first network management unit determines the transport requirement information corresponding to the node instance information.

The transport descriptor herein may be a link descriptor or a virtual link descriptor. The word "descriptor" herein is not limited, and may be a template, a blueprint, or the like.

For example, the transport descriptor includes the following information: a node type 1, a latency 5 ms, and that the node instance description information corresponding to the node instance information is the node type 1, and then, the transport requirement information corresponding to the node instance information may be determined, that is, the latency is 5 ms.

For another example, the transport descriptor includes the following information: a node type 1, a node type 2, a latency 5 ms, and that node instance description information corresponding to node instance information 1 is the node type 1, node instance description information corresponding to node instance information 2 is the node type 2, and it may be determined that a latency required for transport between the node instance information 1 and the node instance information 2 is 5 ms.

Compared with S202, the first network management unit may further determine, based on the node instance information and a preset policy, the transport requirement information corresponding to the node instance. The preset policy may be a correspondence between the node description information and the transport requirement information. For example, a latency between the node type 1 and the node type 2 is 5 ms.

The following uses a specific example to describe a case in which the NSMF decomposes the network slice requirement information into network slice subnet requirement information, and determines the transport requirement information.

In an example, the subnet requirement information and the transport requirement information may be determined based on a preset policy.

For example, according to the decomposition algorithm, a ratio of a latency of a core network subnet:a latency of an access network subnet:a transport latency is 1:2:3. When the requirement information of the network slice carries a latency of 6 ms, it may be determined, based on the decomposition algorithm, that the latency of the core network subnet is 1 ms, the latency of the access network subnet is 2 ms, and the transport latency is 3 ms.

The transport requirement information may include, but is not limited to, one or more of the following: a latency, bandwidth, location constraint information, QoS, bearer information, a network type, reliability information, mobility, and isolation requirement information. The location constraint information may include affinity or anti-affinity, a data center DC, a region region, and the like. S203. The first network management unit sends a transport request message to a transport network manager, where the transport request message carries the transport requirement information and the node instance information.

The transport request message is used to request a transport resource of the node instance corresponding to the node instance information.

The node instance information is obtained by using the NSMF, and the transport requirement information is automatically determined based on the node instance information, so that transport corresponding to the node instance is automatically deployed. In the network slice deployment method provided in this embodiment of this application, a transport network can be automatically created, to improve network slice deployment efficiency.

FIG. 3 shows another network slice deployment method according to an embodiment of this application. The method may be applied to the network architecture shown in FIG. 1. A main difference between this embodiment and the foregoing embodiment is that a transport network manager may determine transport requirement information to configure a transport resource. A specific method is as follows.

S301. A transport network manager obtains node instance information, where the node instance information includes identifier information of a node instance or a network address of a node instance.

S302. The transport network manager determines transport requirement information corresponding to the node instance information.

For a manner in which the transport network manager determines a transport requirement, refer to a specific implementation in the foregoing embodiment.

S303. The transport network manager configures a transport resource corresponding to the transport requirement information.

For a manner in which the transport network manager determines a transport requirement, refer to a specific implementation in the foregoing embodiment.

In this embodiment of this application, the transport network manager determines the transport requirement information, to configure the transport resource, thereby implementing network element function centralization, improving network creation efficiency, and satisfying rapid service launching.

Before S301, to be specific, before the transport network manager obtains the node instance information, the transport network manager sends a query request to a second network management unit, where the query request carries node requirement information or slice information.

The second network management unit may be a DM, and specifically, may be an NSSMF.

Before S301, to be specific, before the transport network manager obtains the node instance information, the transport network manager receives a transport management request sent by a network management unit, where the transport management request carries at least one piece of transport requirement information. In S302, the transport network manager determines corresponding transport requirement information in the at least one piece of transport requirement information based on the node instance information.

Specifically, the transport network manager may determine node instance description information based on the node instance information, and determine, based on the node instance description information, the transport requirement information corresponding to the node instance information.

Before S301, to be specific, before the transport network manager obtains the node instance information, the transport network manager receives a transport management request sent by a network management unit, where the transport management request carries at least one transport descriptor or at least one piece of transport descriptor indication information. The transport descriptor indication information is used to obtain the transport descriptor. The transport descriptor includes the transport requirement information. Optionally, the transport descriptor includes the node requirement information or node template information.

The transport network manager may also determine the node instance description information based on the node instance information, and determine a corresponding transport descriptor in the at least one transport descriptor based on the node instance description information, where the transport descriptor includes the transport requirement information and the corresponding node instance description information, so that the transport network manager determines the transport requirement information corresponding to the node instance information.

The foregoing describes the solutions in the embodiments of this application mainly from a perspective of interaction between network elements. It may be understood that to implement the foregoing functions, the network elements, for example, the first management unit and the second management unit, include a corresponding hardware structure and/or a corresponding software module for performing the functions. A person skilled in the art should easily be aware that, units and algorithm steps in the examples described with reference to the embodiments disclosed in this specification may be implemented in a form of hardware or in a form of a combination of hardware and computer software in this application. Whether a function is performed by hardware or hardware driven by computer software depends on particular applications and design constraints of the technical solutions. A person skilled in the art may use a different method to implement the described functions for each particular application, but it should not be considered that the implementation goes beyond the scope of this application.

In the embodiments of this application, the first management unit, the second management unit, and the like may be divided into function modules based on the foregoing method examples. For example, the function modules may be obtained through division based on the corresponding functions, or two or more functions may be integrated into one processing module. The integrated module may be implemented in a form of hardware, or may be implemented in a form of a software function module. It should be noted that the module division in the embodiments of this application is an example, and is merely logical function division, and there may be other division manners in actual implementation.

Figure 4:
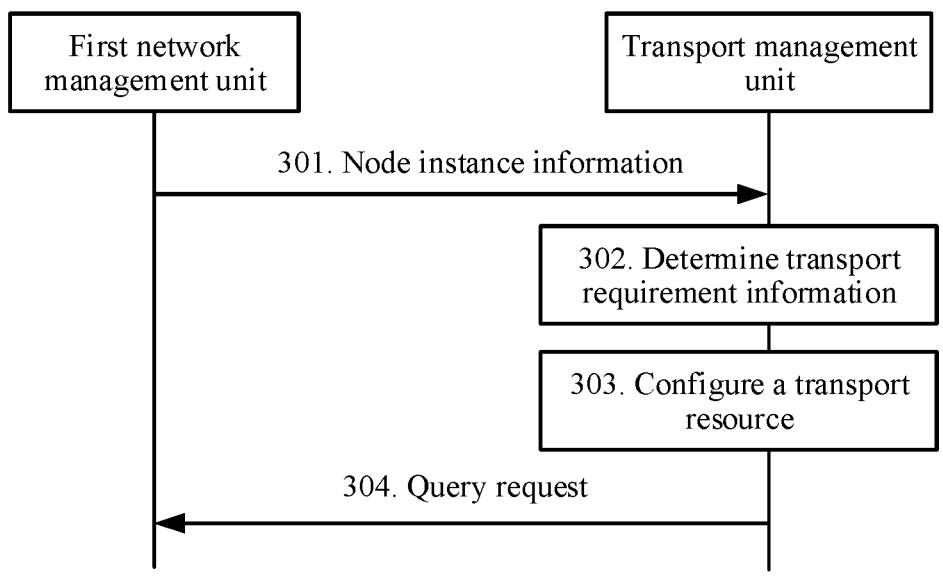
FIG. 4 is a flowchart of another network slice deployment method according to an embodiment of this application.
Figure 5:
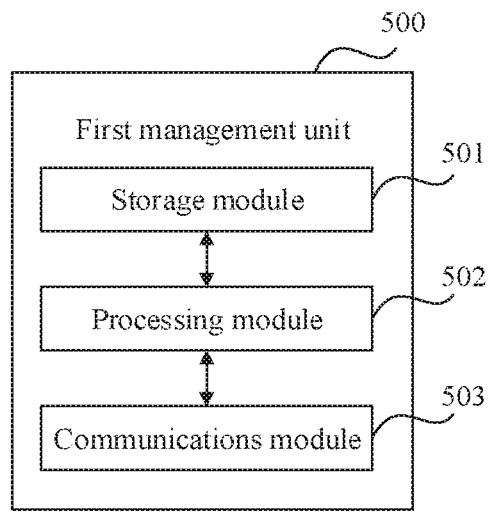
FIG. 5 is a schematic structural diagram of a management unit according to an embodiment of this application.

When integrated modules are used, FIG. 5 is a possible schematic structural diagram of the first network management unit in the foregoing embodiments. The first network management unit may exist in a product form of a chip. The network management unit 500 includes a processing module 502 and a communications module 503. The processing module 502 is configured to control and manage an action of the network management unit. For example, the processing module 502 is configured to support the network management unit in performing processes 201, 202, and 203 in FIG. 2, 2011 and 2013 in FIG. 3, and 301 and 304 in FIG. 4, and/or is used in another process of the technology described in this specification. The communications module 503 is configured to support communication between the first network management unit and another network entity, for example, communication between the first network management unit and the transport network manager. The first network management unit may further include a storage module 501, configured to store program code and data of the first network management unit.

The processing module 502 may be a processor or a controller, for example, may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The processing module 502 may implement or execute various examples of logical blocks, modules, and circuits described with reference to content disclosed in this application. Alternatively, the processor may be a combination for implementing a computing function, for example, a combination of one or more microprocessors, or a combination of the DSP and a microprocessor. The communications module 503 may be a communications interface, a transceiver, a transceiver circuit, or the like. The communications interface is a collective term and may include one or more interfaces. The storage module 501 may be a memory.

Figure 6:
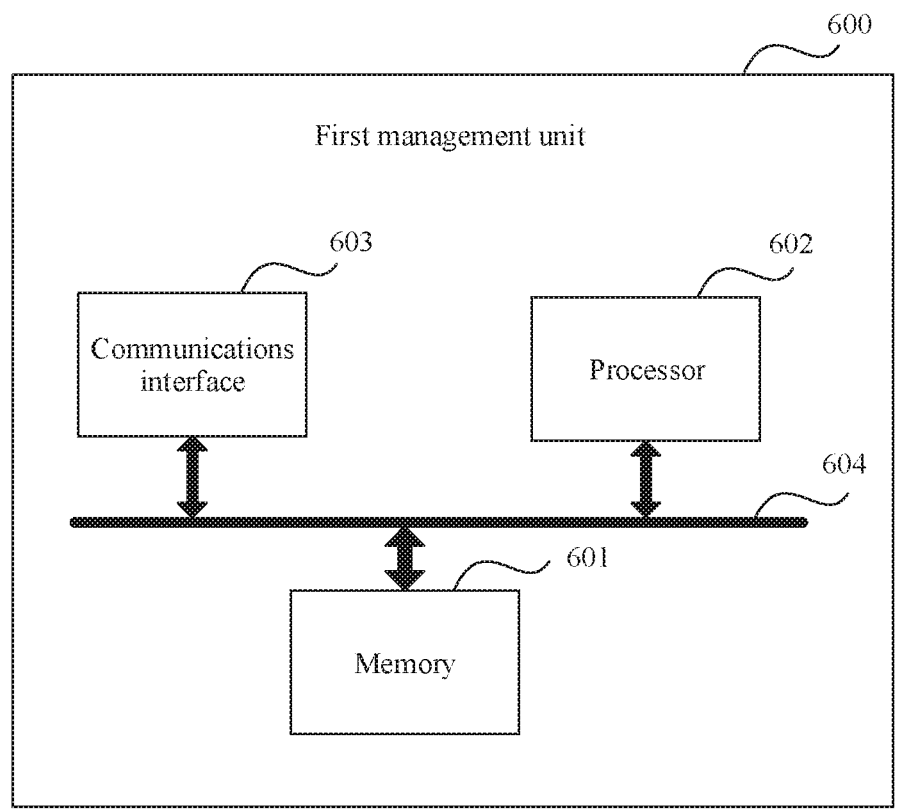
FIG. 6 is a schematic structural diagram of another management unit according to an embodiment of this application.

When the processing module 502 is a processor, the communications module 503 is a communications interface, and the storage module 501 is a memory, the first network management unit in this embodiment of this application may be a first network management unit shown in FIG. 6. Referring to FIG. 6, the first network management unit 600 includes a processor 602, a communications interface 603, and a memory 601. Optionally, the first network management unit 600 may further include a bus 604. The communications interface 603, the processor 602, and the memory 601 may be interconnected by using the bus 604. The bus 604 may be a peripheral component interconnect (PCI) bus, an extended industry standard architecture (EISA) bus, or the like. The bus 604 may be categorized as an address bus, a data bus, a control bus, and the like. For ease of representation, only one thick line is used to represent the bus in FIG. 6, but this does not mean that there is only one bus or only one type of bus.

Figure 7:
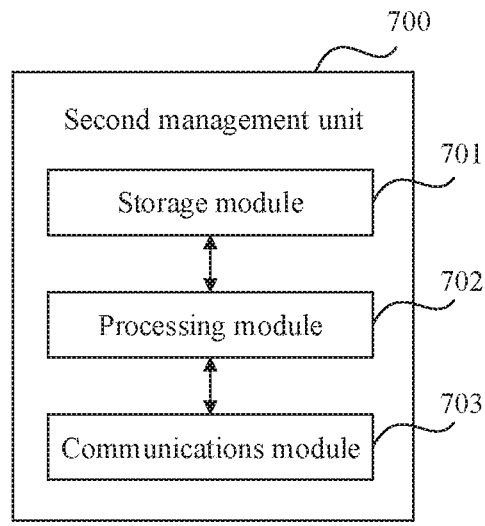
FIG. 7 is a schematic structural diagram of a transport network manager according to an embodiment of this application.

When integrated modules are used, FIG. 7 is a possible schematic structural diagram of the transport network manager in the foregoing embodiments. The transport network manager may exist in a product form of a chip. The transport network manager 700 includes a processing module 702 and a communications module 703. The processing module 702 is configured to control and manage an action of the transport network manager. For example, the processing module 702 is configured to support the transport network manager in performing 203 in FIG. 2 and processes 301, 302, 303, and 304 in FIG. 4, and/or is used in another process of the technology described in this specification. The communications module 703 is configured to support communication between the transport network manager and another network entity, for example, communication between the transport network manager and the first network management unit. The transport network manager may further include a storage module 701, configured to store program code and data of the transport network manager.

The processing module 702 may be a processor or a controller, such as a central processing unit (CPU), a general-purpose processor, a digital signal processor (DSP), an application-specific integrated circuit (ASIC), a field programmable gate array (FPGA), or another programmable logic device, a transistor logic device, a hardware component, or any combination thereof. The processing module 702 may implement or execute various examples of logical blocks, modules, and circuits described with reference to content disclosed in this application. Alternatively, the processor may be a combination for implementing a computing function, for example, a combination of one or more microprocessors, or a combination of the DSP and a microprocessor. The communications module 703 may be a communications interface, a transceiver, a transceiver circuit, or the like. The communications interface is a collective term and may include one or more interfaces. The storage module 701 may be a memory.

Figure 8:
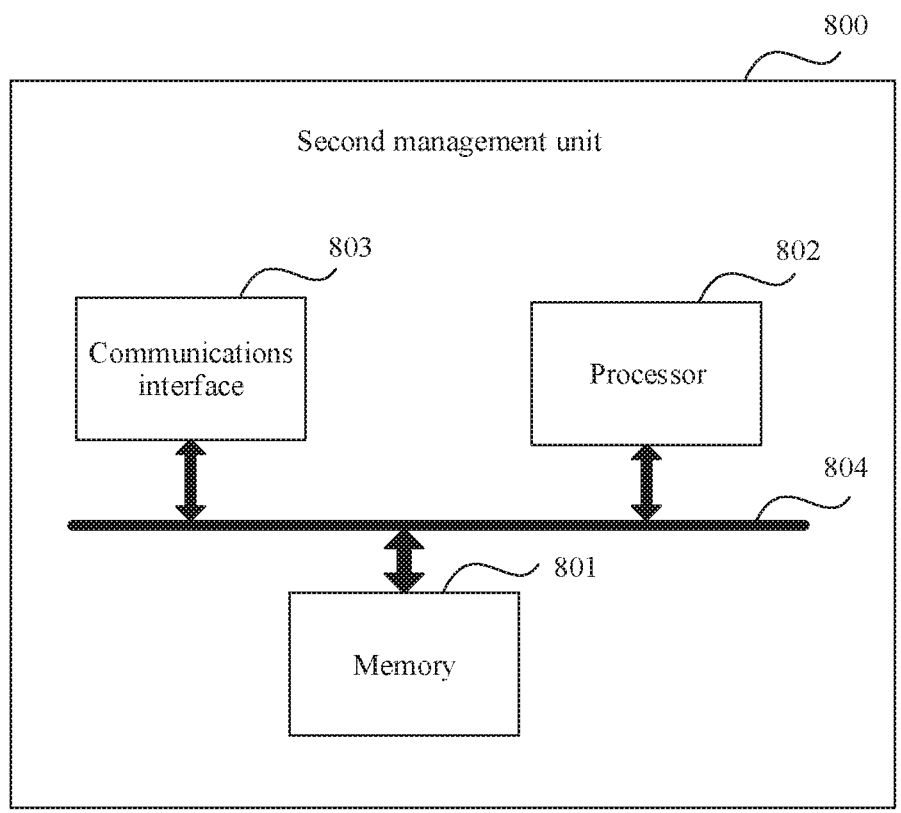
FIG. 8 is a schematic structural diagram of another transport network manager according to an embodiment of this application.

When the processing module 702 is a processor, the communications module 703 is a communications interface, and the storage module 701 is a memory, the transport network manager in this embodiment of this application may be a transport network manager shown in FIG. 8.

Referring to FIG. 8, the transport network manager 800 includes a processor 802, a communications interface 803, and a memory 801. Optionally, the transport network manager 800 may further include a bus 804. The communications interface 803, the processor 802, and the memory 801 may be interconnected by using the bus 804. The bus 804 may be a peripheral component interconnect (PCI) bus, an extended industry standard architecture (EISA) bus, or the like. The bus 804 may be categorized as an address bus, a data bus, a control bus, and the like. For ease of representation, the bus is represented by using only one thick line in FIG. 8. However, it does not mean that there is only one bus or only one type of bus.

The method or algorithm steps described with reference to the content disclosed in this application may be implemented by hardware, or may be implemented by the processor by executing a software instruction. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to the processor, so that the processor can read information from the storage medium, and write information into the storage medium. Certainly, the storage medium may alternatively be a component of the processor. The processor and the storage medium may be located in an ASIC. In addition, the ASIC may be located in a core network interface device. Certainly, the processor and the storage medium may exist in the core network interface device as discrete components.

A person skilled in the art should be aware that in the foregoing one or more examples, the functions described in this application may be implemented by hardware, software, firmware, or any combination thereof. When the functions are implemented by software, the functions may be stored in a computer-readable medium or transmitted as one or more instructions or code in a computer-readable medium. The computer-readable medium includes a computer storage medium and a communications medium, where the communications medium includes any medium that facilitates transport of a computer program from one place to another. The storage medium may be any available medium accessible to a general-purpose or dedicated computer.

The objectives, technical solutions, and beneficial effects of this application are further described in detail in the foregoing specific embodiments. It should be understood that the foregoing descriptions are merely specific embodiments of this application, but are not intended to limit the protection scope of this application. Any modification, equivalent replacement, improvement, or the like made based on the technical solutions of this application shall fall within the protection scope of this application.

What is claimed is:

1. A network slice deployment method, comprising:
   sending, by a first network manager, network slice subnet requirement information to a second network manager, wherein the network slice subnet requirement information indicates a requirement for deploying a network slice subnet instance, the network slice subnet instance comprises one or more node instances, the network slice subnet requirement information is decomposed into node requirement information that indicates a requirement for deploying a node instance, and the node instance is a network function device or a network element device;
   after a deployment of the node instance based on the network slice subnet requirement information, obtaining, by the first network manager, node instance information, wherein the node instance information comprises identifier information of the node instance or a network address of the node instance;
   determining, by the first network manager, transport requirement information corresponding to the node instance information, wherein the transport requirement information comprises one or more of a transport deployment specification, a latency, bandwidth, location constraint information, affinity and anti-affinity rules, bearer information, a network type, a reliability requirement, a mobility requirement, or isolation requirement information; and
   sending, by the first network manager, a transport request message to a transport network manager, wherein the transport request message carries the transport requirement information and the node instance information.

2. The method according to claim 1, wherein the deployment of the node instance based on the network slice subnet requirement information comprises:
   a decomposition of the network slice subnet requirement information into node requirement information indicating a requirement for deploying a node instance; and
   a deployment of the node instance based on the node requirement information.

3. The method according to claim 2, wherein the method further comprises:
   obtaining, by the first network manager, node instance description information corresponding to the node instance information, wherein the node instance description information comprises one or more of an identifier of the node requirement information, a node type, an identifier of a node template, location information of a node, or specification information of the node.

4. The method according to claim 1, wherein determining, by the first network manager, the transport requirement information corresponding to the node instance information comprises: determining, by the first network manager, the transport requirement information based on node instance description information corresponding to the node instance information.

5. The method according to claim 1, wherein determining, by the first network manager, the transport requirement information corresponding to the node instance information comprises: determining, by the first network manager, a transport template based on the node instance information, wherein the transport template comprises the transport requirement information.

6. The method according to claim 1, wherein determining, by the first network manager, the transport requirement information corresponding to the node instance information comprises: determining, by the first network manager, the transport requirement information based on the node instance information and a preset policy.

7. The method according to claim 1, further comprising:
   receiving, by the first network manager, network slice requirement information for creating a network slice, wherein the network slice comprises a core network subnet, an access network subnet, and a transport network subnet, the network slice requirement information comprises one or more of a bandwidth, a latency, coverage, a success rate, a location, a traffic model, a quantity of users, or user distribution; and
   decomposing, by the first network manager, the network slice requirement information into the network slice subnet requirement information based on a ratio of respective requirements of the core network subnet, the access network subnet, and the transport network subnet, and
   wherein determining, by the first network manager, the transport requirement information corresponding to the node instance information comprises: determining, by the first network manager, the transport requirement information based on the network slice requirement information and a ratio of respective requirements of the core network subnet, the access network subnet, and the transport network subnet.

8. The method according to claim 1, wherein the method comprises:
obtaining, by the transport network manager, the transport request message; and
configuring, by the transport network manager, a transport resource corresponding to the transport requirement information.

9. A network manager, comprising:
at least one memory; and
at least one processor, wherein the at least one memory is configured to store a program, and wherein the at least one processor is configured to invoke the program in the at least one memory, wherein the program instructs the network manager to:
send network slice subnet requirement information to a second network manager, wherein the network slice subnet requirement information indicates a requirement for deploying a network slice subnet instance, the network slice subnet instance comprises one or more node instances, the network slice subnet requirement information is decomposed into node requirement information that indicates a requirement for deploying a node instance, and the node instance is a network function device or a network element device;
after a deployment of the node instance based on the network slice subnet requirement information, obtain node instance information, wherein the node instance information comprises identifier information of the node instance or a network address of the node instance;
determine transport requirement information corresponding to the node instance information, wherein the transport requirement information comprises one or more of a transport deployment specification, a latency, bandwidth, location constraint information, affinity and anti-affinity rules, bearer information, a network type, a reliability requirement, a mobility requirement, or isolation requirement information; and
send a transport request message to a transport network manager, wherein the transport request message comprises the transport requirement information and the node instance information.

10. The network manager according to claim 9, wherein the deployment of the node instance based on the network slice subnet requirement information comprises:
a decomposition of the network slice subnet requirement information into node requirement information indicating a requirement for deploying a node instance; and
a deployment of the node instance based on the node requirement information.

11. The network manager according to claim 10, wherein the program instructs the network manager to:
obtain node instance description information corresponding to the node instance information, wherein the node instance description information comprises one or more of an identifier of the node requirement information, a node type, an identifier of a node template, location information of a node, and specification information of the node.

12. The network manager according to claim 9, wherein the program instructs the network manager to:
determine the transport requirement information based on node instance description information corresponding to the node instance information.

13. The network manager according to claim 9, wherein the program instructs the network manager to:
determine a transport template based on the node instance information, wherein the transport template comprises the transport requirement information.

14. The network manager according to claim 9, wherein the program instructs the network manager to:
determine the transport requirement information based on the node instance information and a preset policy.

15. The network manager according to claim 9, wherein the program instructs the network manager to:
receive network slice requirement information for creating a network slice, wherein the network slice comprises a core network subnet, an access network subnet, and a transport network subnet, the network slice requirement information comprises one or more of a bandwidth, a latency, coverage, a success rate, a location, a traffic model, a quantity of users, or user distribution; and
decompose the network slice requirement information into the network slice subnet requirement information based on a ratio of respective requirements of the core network subnet, the access network subnet, and the transport network subnet, and
determine the transport requirement information corresponding to the node instance information by operations comprising: determining the transport requirement information based on the network slice requirement information and a ratio of respective requirements of the core network subnet, the access network subnet, and the transport network subnet.

16. A system for deployment network slice, comprising:
a first network manager; and
a transport network manager, wherein:
the first network manager is configured to:
send network slice subnet requirement information to a second network manager, wherein the network slice subnet requirement information indicates a requirement for deploying a network slice subnet instance, the network slice subnet instance comprises one or more node instances, the network slice subnet requirement information is decomposed into node requirement information that indicates a requirement for deploying a node instance, and the node instance is a network function device or a network element device;
after a deployment of the node instance based on the network slice subnet requirement information, obtain node instance information, wherein the node instance information comprises identifier information of the node instance or a network address of the node instance;
determine transport requirement information corresponding to the node instance information, wherein the transport requirement information comprises one or more of a transport deployment specification, a latency, bandwidth, location constraint information, affinity and anti-affinity rules, bearer information, a network type, a reliability requirement, a mobility requirement, or isolation requirement information; and
send a transport request message to a transport network manager, wherein the transport request message carries the transport requirement information and the node instance information, and
the transport network manager is configured to:
obtain the transport request message; and
configure a transport resource corresponding to the transport requirement information.

17. The system according to claim 16, wherein the deployment of the node instance based on the network slice subnet requirement information comprises:
    a decomposition of the network slice subnet requirement information into node requirement information indicating a requirement for deploying a node instance; and
    a deployment of the node instance based on the node requirement information.

18. The system according to claim 17, wherein the first network manager is configured to:
    obtain node instance description information corresponding to the node instance information, wherein the node instance description information comprises one or more of an identifier of the node requirement information, a node type, an identifier of a node template, location information of a node, or specification information of the node.

19. The system according to claim 16, wherein the first network manager is configured to:
    determine the transport requirement information based on node instance description information corresponding to the node instance information.

20. The system according to claim 16, wherein the first network manager is configured to:
    determine a transport template based on the node instance information, wherein the transport template comprises the transport requirement information.

\* \* \* \* \*